UNITED STATES PATENT OFFICE.

JOHN M. ORDWAY, OF ROXBURY, MASSACHUSETTS, ASSIGNOR TO ROXBURY COLOR AND CHEMICAL MANUFACTORY.

IMPROVEMENT IN PREPARING ALKALINE SILICATES.

Specification forming part of Letters Patent No. 16,706, dated February 24, 1857.

*To all whom it may concern:*

Be it known that I, J. M. ORDWAY, of Roxbury, in the county of Norfolk and State of Massachusetts, have invented a new and Improved Process of Manufacturing the Soluble Silicates of Soda or Potash from their Sulphates, of which the following is a full, clear, and exact description.

It is well known that sulphate of soda has been long used, either with or without coal, in the manufacture of insoluble lime-glass, and also that the soluble silicates of soda and potash have been made from the carbonates of the same bases; but the object of my present invention is to obtain from the less costly sulphates of soda or potash the soluble silicates of these bases, and to produce an article which, while it can be offered at a reduced price, is as quickly dissolved as that heretofore used, which are great desiderata to the calico-printer and others using it in the arts.

To enable others skilled in the art to understand and use my invention, I will proceed to describe the method in which I have carried out the same.

I form the soluble silicates of soda or of potash by heating strongly in contact with deoxidizing agents the sulphates of the same alkalies mixed with silica. For this purpose I use a reverberatory furnace constructed of refractory fire-bricks, and having the working-bed slightly concave.

To make soluble silicate of soda I mix together one hundred (100) parts of dry sulphate of soda, or so much of any impure article of commerce as contains one hundred (100) parts of dry sulphate, ninety-four (94) parts of pure silicious sand, and eight (8) parts of fine charcoal or mineral coal. This mixture is exposed to an intense heat with occasional stirrings until the mass becomes fused to a clear glass and the evolution of gas ceases. Should any sulphate of soda remain unchanged, it will show as a thin liquid in the midst of a thicker silicate, and more fine coal is to be added and thoroughly stirred in; but an excess of coal is to be carefully avoided, as it renders the glass brown or black and sulphureted. The exact amount must be determined by adding successive portions and taking out trial specimens of the glass from time to time. When the melted mass has become homogeneous and smooth, and the trial specimens exhibit perfect transparency and a light green or slightly-reddish color, the conversion of the sulphate is completed. The glass is then withdrawn by means of iron hoes, which are often changed and immersed in water to keep them cool.

The silicate may also be made by first fluxing together the coal and sulphate of soda, so as to produce a mixture of sulphate of soda and sulphuret of sodium, and then adding the sand.

The soluble silicate of potash is made by either of the methods above described for making the silicate of soda, taking one hundred and twenty (120) parts of dry sulphate of potash, or whatever contains so much of this alkali, in place of the one hundred (100) parts of sulphate of soda.

It is not necessary to use precisely the proportions of the materials above stated, but I have found these proportions to afford the best and most suitable products.

What I claim as my invention, and desire to secure by Letters Patent, is—

The manufacture of soluble silicates of soda or potash from the sulphates of soda or potash by fluxing the same with silica and deoxidizing agents, in the manner substantially as herein set forth.

JOHN M. ORDWAY.

Witnesses:
EDWARD WISE,
E. HENRY WISE.